F. W. NEVENS.
Assignor, by direct and mesne assignments, to THE ELECTRIC CUTTING MACHINE COMPANY.
CLOTH CUTTING MACHINE.
No. 11,019. Reissued Aug. 6, 1889
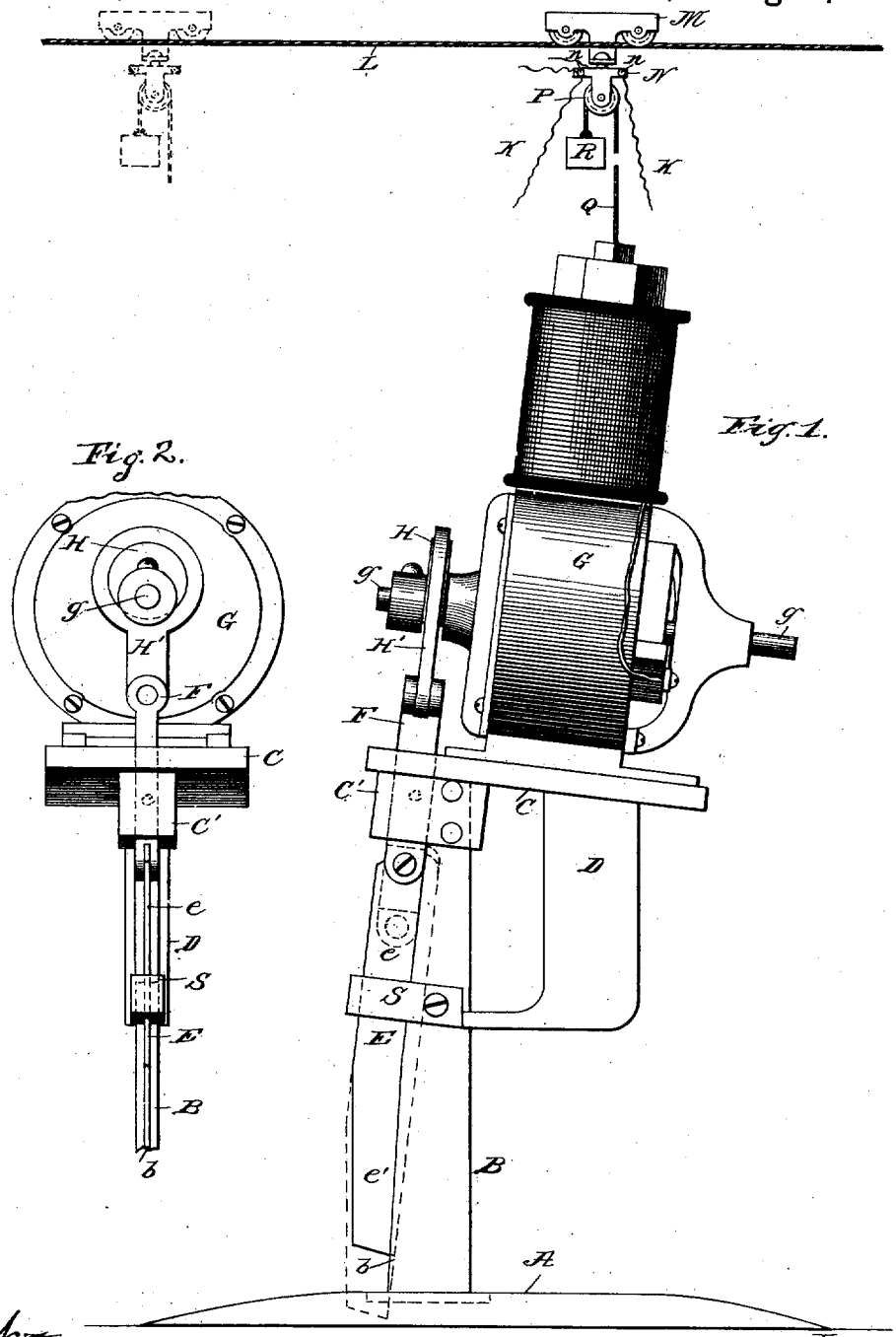
Witnesses.
Wm. Rheem.
Wm. J. Hemings.
Inventor.
Frank W. Nevens
By Clayton, Poole & Brown
His Attys.
THE NORRIS PETERS CO., PHOTO-LITHO., WASHINGTON, D. C.

UNITED STATES PATENT OFFICE.

FRANK W. NEVENS, OF MINNEAPOLIS, MINNESOTA, ASSIGNOR, BY DIRECT AND MESNE ASSIGNMENTS, TO THE ELECTRIC CUTTING MACHINE COMPANY, OF CHICAGO, ILLINOIS.

CLOTH-CUTTING MACHINE.

SPECIFICATION forming part of Reissued Letters Patent No. 11,019, dated August 6, 1889.

Original No. 372,926, dated November 8, 1887. Application for reissue filed February 24, 1888. Serial No. 265,183.

*To all whom it may concern:*

Be it known that I, FRANK W. NEVENS, a citizen of the United States, and a resident of Minneapolis, county of Hennepin, State of Minnesota, have invented a certain new and useful Cloth-Cutting Machine, of which the following is a specification, reference being had to the accompanying drawings.

My invention relates to machines designed for use in the manufacture of ready-made clothing, in multiplying suits from a common pattern, and for similar uses wherein it is desirable to cut through a large number of layers of cloth; and it has for its object to provide a simple, economical, and efficient machine for the purpose.

My invention consists of the construction hereinafter fully described and particularly claimed.

In the drawings, like letters referring to like parts, Figure 1 is a side elevation of my entire machine; and Fig. 2 is a front view of a part of the same, showing the driving mechanism and the means of supporting the knife.

A B C is the main frame, constituting the knife and motor carriage, of which A is a disk-shaped base-plate concave on its under and convex on its upper surface and having a thin-edged periphery. B is a vertical standard rigidly secured to the disk A, and C is a cap-plate and motor-seat rigidly attached to the top of said standard and extending rearward at an acute angle to the same, but at an angle which is only a little less than a right angle.

D is a bracket-shaped brace connecting B and C, serving both to strengthen the frame and as a handle to the machine. The standard B is wider at the bottom than at the top. Its rear edge is straight and perpendicular to the disk A. Its front edge is inclined backward, and the part of it below the handle D is beveled both toward the front and the rear from the central vertical line. The front edge of this standard B is provided with a longitudinal groove *b*, extending its entire length, which is adapted to serve as a seat and guide for the cutting-knife. The cap-plate or motor-seat C extends forward of the standard B and is thickened up in its central part by the downwardly-projecting block C′, cast integral therewith. Through C and C′, from top to bottom, with its back in line with the groove *b*, is cut a rectangular slot *c*, which is adapted for the passage of a cross-head and to serve as a guide for the same.

E is the cutting-knife. It is a flat thin piece of steel the back of which is a straight edge and adapted to fit in the groove *b*, the shank of which *e* is adapted to be attached to a cross-head, and the blade of which *e′* has its cutting-edge on an incline with reference to its back. In other words, the blade is wider at the top than it is at the bottom. The said cutting-edge of the knife is approximately perpendicular to the bottom surface of the base-plate A, so that when the base-plate is resting upon the cutting-table the said cutting-edge will be vertical, or nearly so. The lower end of the blade is not a point, but is at an acute angle to the back of the blade and has a cutting-edge.

F is a cross-head adapted to fit the slot *c* and provided with means for attaching the knife E at one end and a connecting-rod at the other.

G is an electric motor rigidly attached to the cap-plate C, adapted, when connected to a source of electricity, to impart motion to its shaft *g*.

H is an eccentric on the shaft *g*, and H′ is the eccentric-rod connecting the same with the cross-head F.

K and K′ are the wires of an electric circuit connecting the electro-magnets of the motor G with a source of electricity.

L is an elevated track or guide supported at some convenient point above the table on which the cloth is to be cut.

M is a little carriage or traveler movable to and fro along said track. To this carriage by a swivel is attached a block N, with holes or rings *n*, through which pass the wires K K′. To the block N is also attached a sheave P. Over this sheave passes a small chain or rope Q, carrying a counter-weight R at one end and attached at the other to some suitable part of the motor G or the frame of the machine. The function of this counter-weight is to lighten the load which the operator will have to move about in handling the machine. The purpose of the track and traveler is to sustain the wires and counter-weight out of the way and give a wide range of movement to the machine. The reason for setting the motor-seat C at an acute angle to the standard B is to bring the shaft *g* at a like angle to the knife-guide, and thereby impart a drawing cut or shear action to the knife-blade. The knife E is prevented from displacement in its guide *b* by a keeper S, inclosing the heel of the same and attached to the standard B.

The operation of the machine is as follows: The shaft *g* being set in motion by connecting the electro-magnets of the motor G with a source of electricity, the knife E is moved up and down in its guide with great rapidity. The layers of cloth are fastened together with the pattern on top. The machine is then moved forward by the operator, the disk A passing under the lowest layer and the blade *e* following the lines of the pattern and cutting through the entire mass. The number of layers of cloth which may be cut through in this way, forming duplicates of a common pattern, is limited only by the power of the motor G, and this may be varied at will by adopting motors of more or less power.

The shape and peculiar motion imparted to my knife are material points in effecting the result. In virtue of the shape of the blade-point there is never any failure to start the cut on the first layer. In virtue of the inclined course of the blade having the substantially vertical cutting-edge the depth of cut is increased throughout the stroke and the knife clears itself on its upward thrust, while in virture of its drawing or shear-like action the cut is made with less power and greater certainty.

It is obviously necessary, in order that the knife in cutting through a thick pile of cloth may produce a number of pieces exactly corresponding with the pattern, that the cutting-edge of the knife should be vertical or perpendicular to the surface or table upon which the cloth rests. It follows that by making the cutting-edge of the knife vertical and giving the knife a bodily movement in a direction inclined to the perpendicular in the manner stated the knife is not only adapted to cut a large number of pieces to an exact pattern, but the knife acts with a draw cut with the advantages hereinbefore stated.

Placing the motor directly on the knife carriage or frame is a material and valuable point in my machine, as it enables the operator to obtain a far wider range of movement with the machine. The mechanism for transmitting the power is all out of his way, his table is clear, and the cloth does not need to be moved in cutting out the pattern. All difficulties commonly arising from disalignment of the layers are thereby avoided. An electric motor is a great convenience, as the necessary electro-motive force can generally be so easily obtained.

The counter-weight R may be kept directly over the machine by making the track L movable over cross-guides placed under its opposite ends.

What I claim, and desire to secure by Letters Patent of the United States, is as follows:

1. A cloth-cutting machine comprising a cutting-knife movable bodily in a direction inclined from the perpendicular and provided with a vertical cutting-edge, and means giving longitudinal reciprocatory motion to said knife, substantially as described.

2. A cloth-cutting machine comprising a disk for lifting the lower layer of cloth, a motor sustained upon the disk, and a knife movable bodily in a direction inclined to the lower bearing-surface of the disk and provided with a cutting-edge which is perpendicular to the said lower surface of the disk, substantially as described.

3. The combination, with a table or horizontal cloth-support and a cutting-machine movable thereon, of an elevated track, and a traveler upon the track connected with and partially supporting the cutting-machine, substantially as described.

4. In a cloth-cutting machine, in combination with a disk adapted to lift up the lower layer of cloth, a vertical standard rigidly attached to said disk and provided with a knife guide or groove at a slightly obtuse angle to said disk, a knife or cutter reciprocating in the vertical plane provided with a straight-edged back adapted to fit into said groove and with a cutting-edge set on an incline upward and outward from said back, and an electromotor located on said carriage and coupled to said cutter, substantially as described, for imparting motion to said knife, whereby said knife operates with a drawing or shear-like cut.

5. In combination with a cloth-cutting machine, an elevated track, a traveler movable to and fro along said track, a pendent block swiveled to said traveler, a sheave attached to said block, and a chain or cord passing over said sheave carrying a counter-weight at one end and attached to said cloth-cutting machine at the other, substantially as described, whereby the work of moving the said machine about the table in cutting the cloth is greatly lessened.

6. In combination, the disk A, the standard B, provided with a knife-groove *b*, cap-plate or motor-seat C at an acute angle to said standard and provided with the cross-head slot or guide *c*, the electric motor G, having a driving-shaft *g* set at an acute angle to the groove *b* when the motor is in position on the seat C, and the vertical plane passing through the axis of the driving-shaft cutting the groove *b*, the cutting-knife E *e e'*, as described, working in the groove *b*, eccentric H on shaft *g*, eccentric-rod H′, cross-head F, working in said slot *c* and connecting said eccentric-rod and knife, and an electric circuit connecting said motor with a source of electricity, substantially as and for the purpose set forth.

In testimony that I claim the foregoing as my invention I affix my signature in presence of two witnesses.

FRANK W. NEVENS.

Witnesses:
C. CLARENCE POOLE,
M. E. DAYTON